E. M. CHAFFEE.
Carriage-Spring.
No 61,712. Patented Feb. 5, 1867.
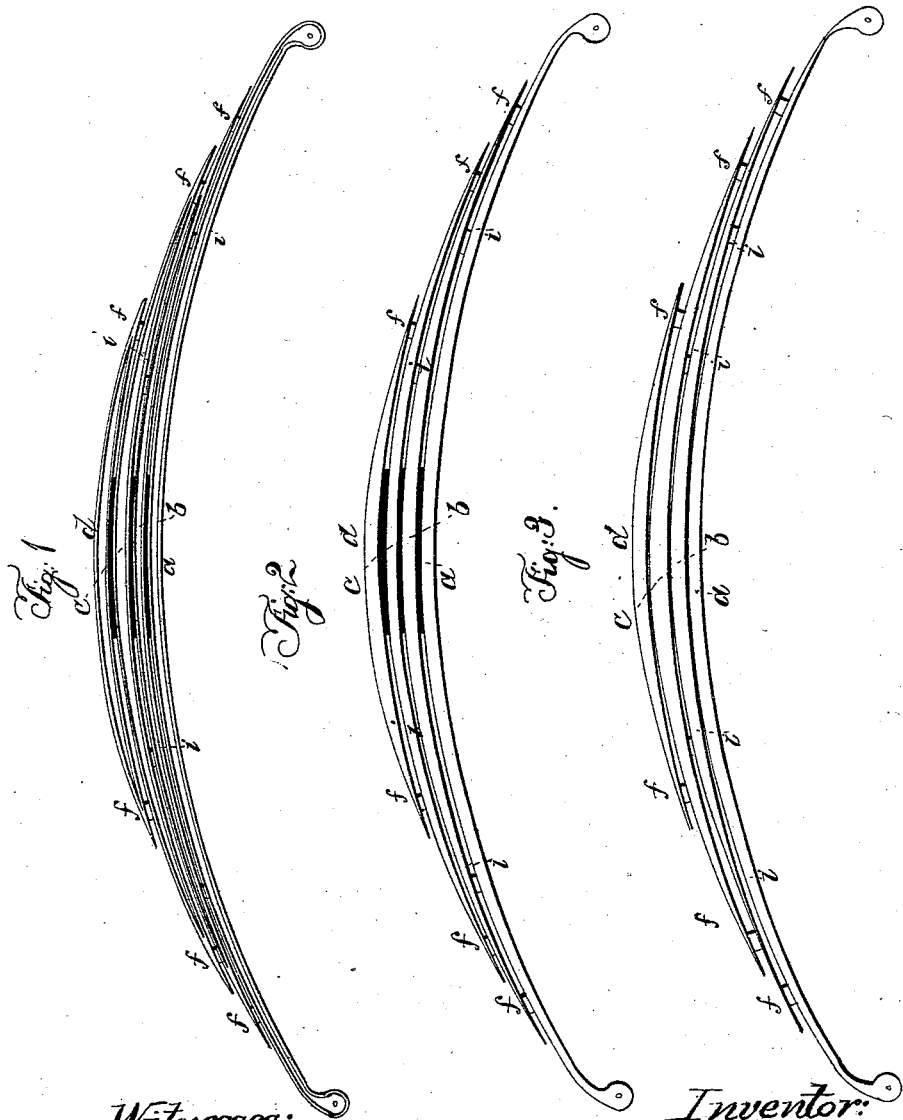

United States Patent Office.

EDWIN M. CHAFFEE, OF PROVIDENCE, RHODE ISLAND.

Letters Patent No. 61,712, dated February 5, 1867.

---

IMPROVEMENT IN ELLIPTIC SPRING FOR CARRIAGES.

---

The Schedule referred to in these Letters Patent and making part of the same.

---

TO ALL WHOM IT MAY CONCERN:

Be it known that I, EDWIN M. CHAFFEE, of Providence, in the county of Providence, and State of Rhode Island, have invented a new Improvement in Elliptic Springs; and I do hereby declare the following, when taken in connection with the accompanying drawings, and the letters of reference marked thereon, to be a full, clear, and exact description of the same, and which said drawings constitute part of this specification, and represent, in—

Figures 1, 2, and 3, a side view of elliptic springs, of different construction, to which my improvement is applied.

My invention relates to an improvement in the common elliptic steel spring, and consists in the introduction of rubber or any of its allied gums between the plates or "lifts" of the spring for the purpose of reducing and preventing the consequent results of friction between the plates.

It is well known that in elliptic springs formed from plates that the wear upon the several plates occasioned by the constant working of one upon another not only reduces the natural elasticity of the several layers, but wears away the metal so rapidly that this otherwise perfect spring is rendered impracticable for many places. By my invention these difficulties are entirely overcome; and to enable others skilled in the art to construct and use my improvement, I will proceed to describe the same, as illustrated in the accompanying drawings.

In fig. 1 the plates or lifts $a\ b\ c\ d$ are represented as formed from thin metal. At the centre, between each of the lifts, I place a metal or other plate, as denoted in black, which raises each lift slightly above the one below it; then at or near the points of each lift I place a piece of sheet rubber or similar elastic substance, $f$, fabricated or not, and at intervals on the larger lifts, other pieces, $i$, may be inserted. I find by experiment that the proper size of these pieces is about one-sixteenth of an inch thick and three-eighths of an inch wide, and of a length equal to the width of the plates. In fig. 2 a spring of like construction, but solid plates, is shown, having the rubber introduced in like manner as in fig. 1. In fig. 3 I represent an old spring, into which the rubber is inserted in the following manner: raise the end of each lift slightly from the other, then insert the pieces of rubber in like manner as before described.

More or less pieces may be inserted, and of different size from this described; but as I have before stated, I find this arrangement to be the best for common carriage springs; larger or heavier springs would of course require proportionately increased dimensions of the rubber. If required, the pieces of rubber may be cemented in their places, but this I do not find necessary. The rubber thus inserted when the spring is compressed sustains the plates one from the other, and the natural elasticity of the rubber yields between the two surfaces, so that the rubbing and consequent wear of one plate upon the other is wholly and entirely avoided. If after use it shall from any cause be necessary to replace the rubber, simply raise one plate from the other, remove the rubber, and insert a fresh piece. The wear, however, upon the rubber is so slight that such change would be rendered almost unnecessary. If preferred, an indentation or recess may be formed in the leaves of the spring to receive the rubber, so that the space between the leaves would be nearly closed.

I therefore do not confine myself to the precise manner of inserting the rubber, but having thus fully described my invention, what I claim as new and useful, and desire to secure by Letters Patent, is—

The introduction of India rubber or similar elastic substance between the leaves or lifts of elastic springs, substantially as and for the purposes specified.

EDWIN M. CHAFFEE.

Witnesses:
HENRY MARTIN,
CHARLES SELDEN.